United States Patent [19]
Ishida et al.

[11] Patent Number: 5,205,806
[45] Date of Patent: Apr. 27, 1993

[54] COMPOSITE-MACHINING MACHINE TOOL

[75] Inventors: Kenichi Ishida; Shinichi Yamazaki; Masaki Yoshioka, all of Niigata, Japan

[73] Assignee: Tsugami Corporation, Tokyo, Japan

[21] Appl. No.: 836,910

[22] Filed: Feb. 19, 1992

[30] Foreign Application Priority Data

Feb. 20, 1991 [JP] Japan .................. 3-047623

[51] Int. Cl.⁵ .................................. B23Q 3/157
[52] U.S. Cl. ........................... 483/18; 29/33 P; 409/11; 409/16; 483/19
[58] Field of Search .................. 483/1, 18, 19, 24; 409/11, 12, 16; 29/33 P, 563

[56] References Cited

U.S. PATENT DOCUMENTS 4,287,659  9/1981  Erhardt et al. ............... 483/18 X
4,590,661  5/1986  Lunazzi .......................... 483/18
4,785,525 11/1988  Ishida et al. .................... 483/18

FOREIGN PATENT DOCUMENTS 63-74534   5/1988  Japan .
63-212432  5/1988  Japan .

Primary Examiner—Z. R. Bilinsky
Attorney, Agent, or Firm—Sughrue, Mion, Zinn, Macpeak & Seas

[57] ABSTRACT

In a composite-machining machine tool for carrying out a turning operation and a machining center operation, a B-axis shaft 13, having a tool spindle head 14 mounted on its front end, is rotatably supported by a Y-axis slide 10, and the B-axis shaft 13 can be indexingly rotated by a B-axis servomotor 22. Clamp pistons 26 are provided in opposed relation to a flange portion 25 of a front end portion 13A of the B-axis shaft, and the clamp pistons 26 are pressed against the flange portion 25 to thereby fix the B-axis shaft at an arbitrary rotational angle position. By doing so, a hobbing tool 29 can be fixed in such a manner that the axis of this hobbing tool can be precisely indexed at a desired angular position with respect to a workpiece W, thereby enabling a hobbing operation.

4 Claims, 5 Drawing Sheets

COMPOSITE-MACHINING MACHINE TOOL

BACKGROUND OF THE INVENTION

This invention relates to a composite-machining machine tool capable of carrying out a machining center operation and a hobbing operation in addition to a turning operation.

Recently, in order to carrying out various kinds of machinings with a single machine tool, there have been developed composite-machining machine tools which can carry out a machining center operation in addition to a turning operation. The Applicant of the present invention developed a composite-machining machine tool capable of efficiently carrying out various kinds of machinings including milling, drilling, tapping and etc., and filed a patent application for it (Japanese Laid-Open Patent Application No. 63-74534). The Applicant also developed a mechanism by which a workpiece can be automatically attached and detached relative to this kind of machine tool, using a pallet, and filed a patent application for it (Japanese Laid-Open Patent Application No. 63-212432). However, although such composite-machining machine tools can carry out milling, drilling, tapping and etc., they are not provided with a mechanism for generating gear teeth by hobbing, and thus the generation of the gear teeth could not be done. Namely, in order to generate the gear teeth by hobbing, the lead angle of the hobbing must be delicately (for example, with a precision of about 0.001 degrees) positioned depending on the diameter of the gear to be machined, and there has heretofore not existed any composite-machining machine tool provided with a mechanism for effecting such precise positioning, and therefore the hobbing could not be carried out.

On the other hand, most of conventional hobbing machines are designed to perform only a hobbing operation, and with respect to composite machining effected by the hobbing machine, a turning operation can be carried out at best in addition to the hobbing operation. Therefore, conventionally, in order to machine a workpiece to be subjected to gear formation, machinings, such as turning, milling, drilling, tapping and so on, are applied to those portions of the workpiece except for the gear portion, using the composite-machining machine tool as disclosed in the above-mentioned publications, and then the workpiece is set in a gear formation machine such as a hobbing machine, thereby machining the gear portion. Thus, the machining of at least two steps must be done, and much labor and time have been required for the machining.

SUMMARY OF THE INVENTION

The present invention has been made under the above circumstances, and an object of the invention is to provide a composite-machining machine tool which can carry out a hobbing operation in addition to a turning operation and a machining center operation.

A composite-machining machine tool of the present invention is based on the composite-machining machine tool proposed in the above-mentioned Japanese Laid-Open Patent Application No. 63-74534. Namely, a composite-machining machine tool of the present invention basically comprises a bed; a table movable relative to the bed in a horizontal Z-axis direction; a Z-axis drive device for reciprocally moving the table in the Z-axis direction; a headstock mounted on the table; a workpiece-holding work spindle rotatably held by the headstock in such a manner that an axis of the work spindle extends in the Z-axis direction; a spindle drive device for rotating the work spindle; a column fixedly mounted on the bed and having a guide surface extending in an X-axis direction perpendicular to the Z-axis direction; an X-axis slide supported on the guide surface of the column so as to move in the X-axis direction; an X-axis drive device for reciprocally moving the X-axis slide in the X-axis direction; a Y-axis slide supported on the X-axis slide so as to move in a Y-axis direction perpendicular to the X-axis and the Y-axis; a Y-axis drive device for reciprocally moving the Y-axis slide; a B-axis shaft supported on the Y-axis slide for rotation about an axis extending in the Y-axis direction; a tool spindle head mounted on a front end of the B-axis shaft, the tool spindle head having a rotatably-supported tool spindle having an axis perpendicular to the Y-axis direction; a tool spindle drive device for rotating the tool spindle; a B-axis indexing mechanism for indexingly rotating the B-axis shaft; a positioning coupling for fixing the B-axis shaft at a plurality of rotational angle positions with respect to the Y-axis slide; a tool magazine provided above the column; and an automatic tool exchange device for exchanging a tool in the tool magazine with a tool held by the tool spindle head. Further, in the present invention, a clamp piston is provided at the Y-axis slide so as to fix the B-axis shaft at an arbitrary rotational angle position with respect to the Y-axis slide, and a control device is provided for synchronizing the rotation of the work spindle with the rotation of the tool spindle so as to form gear teeth by hobbing.

In the machine tool of the above construction of the present invention, the workpiece held by the work spindle is movable in the Z-axis direction, and the tool held by the tool spindle is rotatable about the axis thereof, and also is movable in the X-axis direction and the Y-axis direction, and is rotatable (B-axis rotation) about the axis parallel to the Y-axis direction. Therefore, a complicated machining, such for example as drilling and milling, by the rotary tool can be effected, and the automatic exchange of the tools can be effected by the automatic tool exchange device. Further, a hobbing tool to be used as the tool is attached to the tool spindle, and the rotations of the tool spindle and the work spindle are synchronized with each other, and by doing so, gear teeth are formed in the workpiece. At this time, the B-axis shaft holding the tool spindle head is delicately rotated to adjust its rotational position, and the clamp piston is operated to fix the B-axis shaft in this position, so that the axis of the hobbing tool held by the tool spindle can be adjusted at a desired angle with respect to the axis of the workpiece, and the hobbing tool can be fixed in such a manner that the lead angle thereof is adjusted to a desired value. And besides, the hobbing tool attached to the tool spindle can be controlled in various manner by controlling the tool spindle, and therefore the workpiece to be machined by it can have various kinds of gears, that is, not only a spur gear but also a helical gear and a spiral gear, and further the module and the number of teeth can be changed in various manner, and various kinds of gears can be formed.

DETAILED DESCRIPTION OF THE PREFERRED EMBODIMENTS

Figure 1:
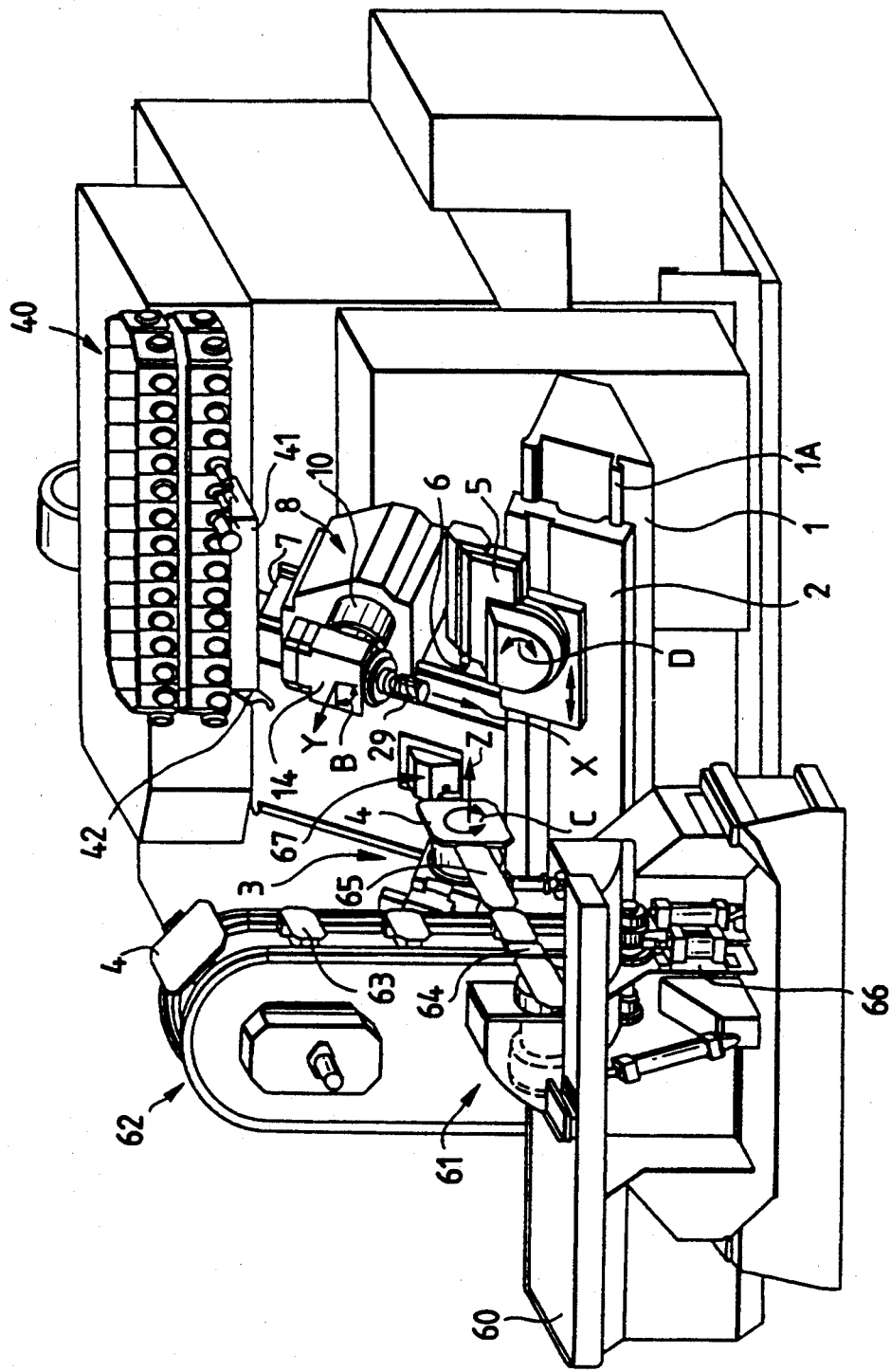
FIG. 1 is a schematic perspective view of one embodiment of a composite-machining machine tool of the present invention.

A preferred embodiment of the present invention shown in the drawings will now be described. FIG. 1 is a schematic perspective view of a preferred embodiment of a composite-machining machine tool of the present invention. In this Figure, a bed 1 is mounted on a front side of the machine tool, and has at its front face a guide surface 1A which is inclined and extends in a horizontal Z-axis direction. A table 2 is slidably supported on the guide surface 1A. A Z-axis drive device (not shown) for driving the table 2 in the Z-axis direction is connected to the table 2, the Z-axis drive device comprising a Z-axis servomotor and a ball thread means. A workpiece-holding headstock 3 is supported on the table 2, and has a work spindle (later described in detail) having an axis extending in the Z-axis direction, and a pallet 4 holding a workpiece (not shown) is attached to a distal end thereof. Provided on the work spindle is a spindle drive device which comprises a drive motor for rotating the work spindle at high speed for turning operation, and a C-axis servomotor for indexingly rotating (rotating about the C-axis) the work spindle for applying milling, drilling, hobbing and so on to the workpiece. A tailstock 5 has a center 6 coaxial with the work spindle of the headstock 3, and is supported for sliding movement relative to the table 2 in the Z-axis direction. With this construction, the position of the tailstock 5 is adjusted in accordance with the size of the workpiece so that one end of the workpiece can be supported by the center 6. The tailstock 5 is swingable in a direction indicated by arrow D, and therefore is retractable to avoid the interference with a tool when a milling operation or a drilling operation is applied to the distal end of the workpiece from the Z-axis direction.

A column 7 is disposed perpendicular to the bed 1, and is inclined with respect to the vertical. This column has a guide surface which is inclined with respect to the vertical and extends in an X-axis direction perpendicular to the Z-axis. An X-axis slide 8 is mounted on this guide surface for sliding movement in the X-axis direction. An X-axis drive device, which comprises an X-axis servomotor and a ball thread means (both of which are not shown), is connected to the X-axis slide 8.

Figure 2:
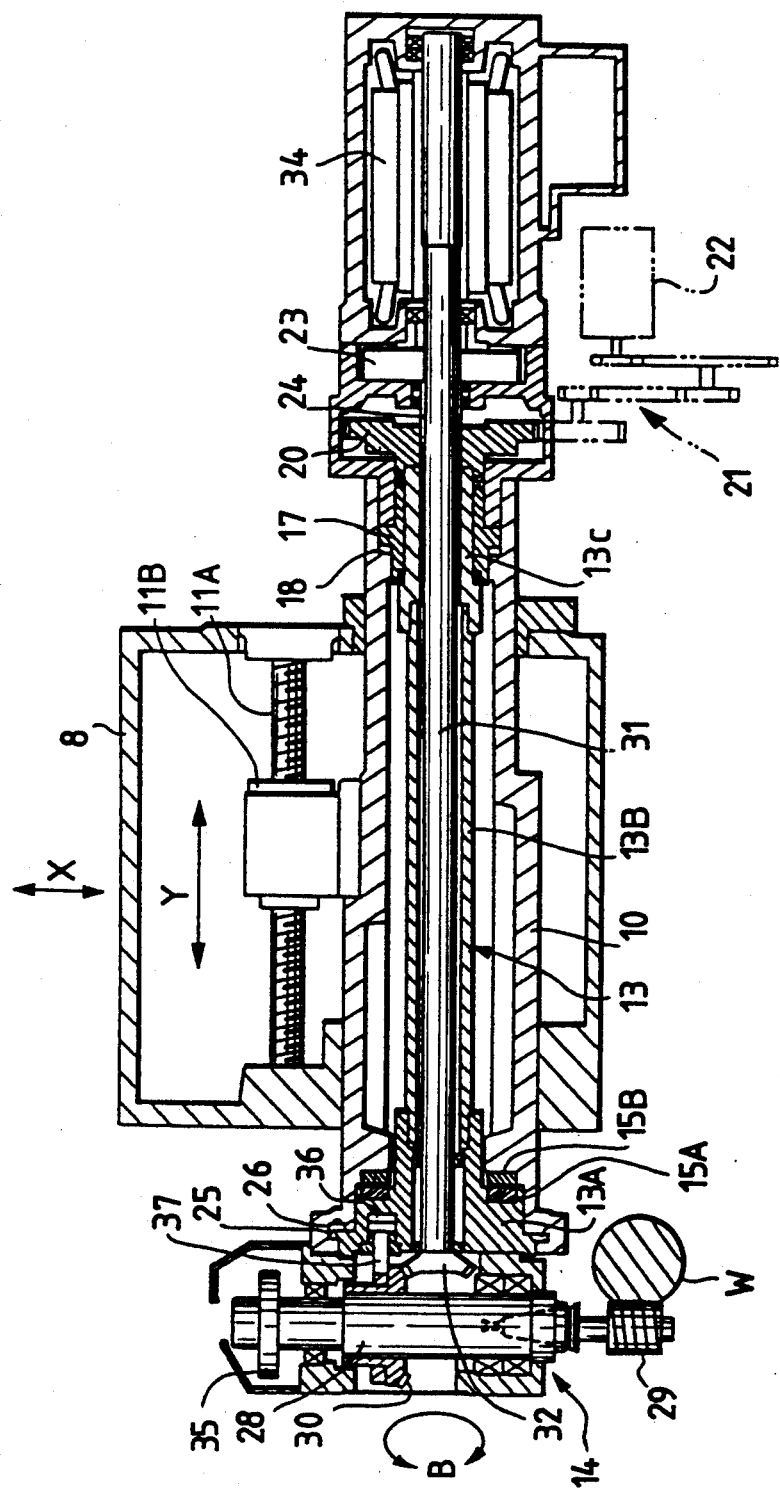
FIG. 2 is a cross-sectional views showing an X-axis slide, a Y-axis slide and etc., of the above machine tool.

FIG. 2 is a schematic cross-sectional view showing the X-axis slide 8 and parts supported thereon. A cylindrical Y-axis slide 10 is supported on the X-axis slide 8 for sliding movement relative to it in a Y-axis direction perpendicular to the X-axis direction and the Z-axis direction (the direction perpendicular to the sheet of FIG. 2). A nut 11B meshed with a ball thread 11A is mounted on the Y-axis slide 10, and a Y-axis servomotor (not shown) is connected to the ball thread 11A. The ball thread 11A is rotated in normal and reverse directions by the Y-axis servomotor to thereby reciprocally move the Y-axis slide 10 in the Y-axis direction. Therefore, the Y-axis servomotor, the ball thread 11A and etc., constitute a Y-axis drive device for reciprocally moving the Y-axis slide 10 in the Y-axis direction.

A B-axis shaft 13 having an axis in the Y-axis is supported within the Y-axis slide 10, and is rotatable about its axis (this rotation direction is referred to as a B-axis direction), and is movable in the direction of its axis. The B-axis shaft 13 has a front end portion 13A, a connecting portion 13B and a rear end portion 13C which are connected together for rotation in unison. A tool spindle head 14 is mounted on the front end portion 13A. Coupling members 15A and 15B engageable and disengageable relative to each other are mounted respectively on those surfaces of the front end portion 13A and the Y-axis slide 10 opposed to each other in the Y-axis direction. Each of the coupling members 15A and 15B has many teeth and grooves, and the teeth and grooves of one coupling member are engageable with the grooves and teeth of the other coupling member. When are engaged with each other, the rotation of the B-axis shaft 13 is prevented, and when they are disengaged from each other, the rotation of the B-axis shaft 13 is enabled. The number and positions of the teeth and grooves provided on the coupling members 15A and 15B are so determined that the two can be fixed at many different rotational angle positions, and in this embodiment they are so determined that the tool spindle head 14 can be indexed at a pitch of one degree in the B-axis direction. The coupling members 15A and 15B constitute a positioning coupling which fixes the B-axis shaft at a plurality of rotational angle positions relative to the Y-axis slide.

A piston 17 is fixedly secured to the rear end portion 13C of the B-axis shaft 13, and this piston 17 is slidably received in a cylinder chamber 18 formed in the Y-axis slide 10. The piston 17 and the cylinder chamber 18 serve to reciprocally move the B-axis shaft 13 relative to the Y-axis slide 10 in the Y-axis direction so as to engage and disengage the coupling members 15A and 15B relative to each other. A gear 20 is mounted on the rear end of the B-axis shaft 13, and is connected to a B-axis indexing motor 22 through a gear train 21. The B-axis indexing motor 22, the gear train 21, the gear 20 and etc., constitute a B-axis indexing mechanism for indexingly rotating the B-axis shaft 13. A B-axis indexing position detection encoder 23 is provided at the rear end of the B-axis shaft 13, and is connected to the gear 20 through a coupling 24. Instead of connecting the encoder 23 to the gear 20 through the coupling 24, this encoder may be operated in associated relation to the B-axis shaft 13 through a suitable gear train; however, the construction in the illustrated embodiment can provide a higher precision of the position detection than the construction using the gear train, and is suited for indexing the B-axis shaft with a high precision of about 0.001 degrees.

Figure 3:
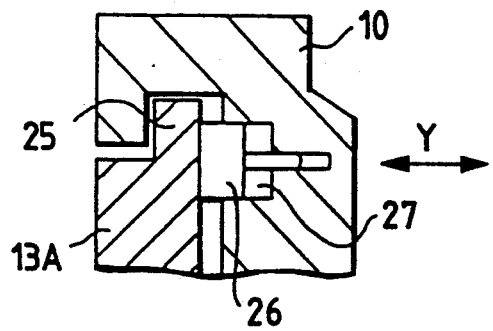
FIG. 3 is a schematic perspective view showing the vicinity of a clamp piston.

A flange portion 25 is formed on the front end portion 13A of the B-axis shaft 13, and clamp pistons 26 are provided at that portion of the Y-axis slide 10 facing the flange portion 25. As shown in FIG. 3, the clamp piston 26 is received in a cylinder chamber 27, formed in the Y-axis slide 10, so as to slide in the Y-axis direction, and has a front end which can be projected to abut against the flange portion 25. When a hydraulic pressure is applied to the cylinder chamber 27, the clamp piston 26 is abutted against the flange portion 25 to fix the flange portion 25 against rotation by a frictional force. The opposed surfaces of the flange portion 25 and the clamp piston 26 are flat, and therefore the flange portion 25 can be fixed at an arbitrary rotational angle position by the clamp piston 26. In order to ensure the fixing of the flange portion 25, usually, a plurality of (for example, 18) clamp pistons 26 are arranged circumferentially at equal pitch.

In FIG. 2, the tool spindle head 14 rotatably holds a tool spindle 28 whose axis is perpendicular to the B-axis shaft 13, and various kinds of tools, including a fixed tool such a cutting tool, a rotary tool such as a drilling tool and a milling tool, and a hobbing tool for forming gear teeth, can be attached to the distal end of the tool spindle 28. In the drawings, a hobbing tool 29 for forming gear teeth in the workpiece W is attached. A bevel gear 30 is mounted on the outer periphery of the tool spindle 28, and a drive shaft 31 is rotatably supported by the B-axis shaft 13 in concentric relation thereto, and a bevel gear 32 in mesh with the bevel gear 30 is mounted on the front end of this drive shaft. A built-in motor 34 is provided at the rear end of the drive shaft 31 so as to rotate the drive shaft 31. The drive shaft 31, the built-in motor 34 and etc., constitute a tool spindle drive device for rotating the tool spindle. An encoder 35 for detecting the rotational angle position of the tool spindle 28 is mounted on the rear end of the tool spindle 28. This encoder 35 may not be mounted on the tool spindle 28, and instead may be mounted on a part (for example, the drive shaft 31) operatively associated with the tool spindle 28; however, when this encoder is mounted on the tool spindle 28 as in this embodiment, a high-precision detection can be made, and therefore this arrangement is preferred.

A cylinder chamber 36 is formed in that portion of the front end portion 13A of the B-axis shaft 13 facing the tool spindle head 14, and a piston 37 is slidably received in this cylinder chamber. The piston 37 has a pin which can be projected toward the tool spindle 28, and by engaging this pin in a groove formed in the tool spindle 28, the tool spindle 28 can be fixed against rotation. Therefore, the cylinder chamber 36, the piston 37 and etc., constitute a lock mechanism for fixing the tool spindle. This lock mechanism is used when the tool spindle must be fixed against rotation as in a turning operation. Although not shown in the drawings, hydraulic passages for the cylinder chambers are formed in the B-axis shaft 13, and solenoid valves for controlling the hydraulic pressures for the cylinder chambers are connected to these hydraulic passages, respectively.

Figure 4:
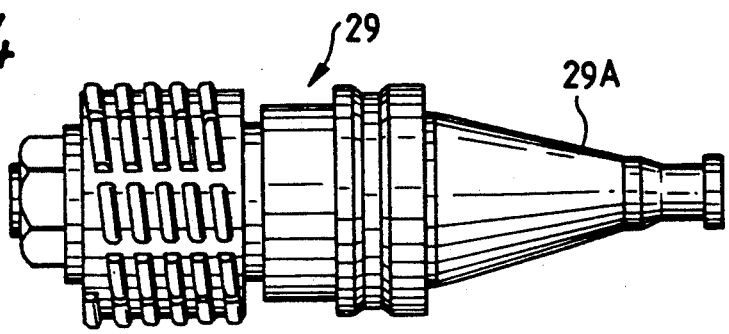
FIG. 4 is a schematic side-elevational view of a hobbing tool.

In FIG. 1, a tool magazine 40 is provided above the column 7, and has an endless two-stage construction in this embodiment. Various tools including an outer diameter-cutting tool and rotary tools are held in the tool magazine 40. All of the various tools used here have the same taper shank so that they can be attached to the tool spindle 28 (see FIG. 2). For example, as shown in FIG. 4, the hobbing tool 29 has a taper shank 29A at its proximal portion, and this taper shank 29A is inserted into the front end portion of the tool spindle 28 so as to be fixed in position relative to the tool spindle 28. In FIG. 1, an automatic tool exchange device 41 is provided at a predetermined position of the tool magazine 40, and reference numeral 42 denotes an ATC arm. The ATC arm 42 can be turned about an axis parallel to the axis of the tool held by the tool magazine and disposed at the tool exchange position, and also can be moved axially. The ACT arm grasps the tool, held by the tool spindle head 14 moved to the tool exchange position, and the tool held by the tool magazine 40 at the same time, and advances to withdraw the two tools, and then is turned 180°, and then is retracted so as to cause the tools to be held by the tool spindle head 14 and the tool magazine 40, thereby effecting the tool exchange. For effecting the tool exchange, the X-axis slide 8 is moved upward along the column 7 to be positioned near the tool magazine 40, and the tool spindle head 14 is so indexed as to position the tool spindle 28 horizontally, thereby setting the tool spindle head 14 in the tool exchange position. In this position, by the ATC arm 42, the tool can be exchanged with the tool in the tool magazine 40, and an arbitrary one of the tools can be held by the tool spindle 28.

Figure 5:
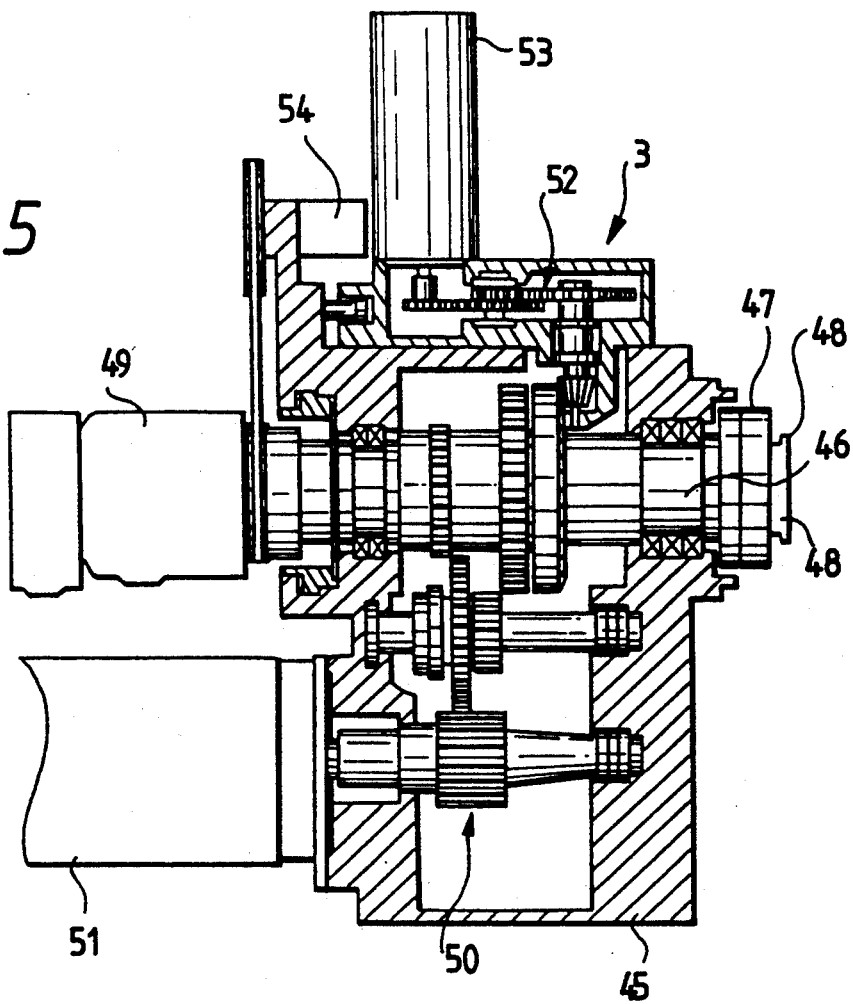
FIG. 5 is a schematic cross-sectional view of a headstock of the above machine tool.

Next, the construction of the headstock 3 will now be described. This headstock 3 is similar in construction to that disclosed in Japanese Laid-Open Patent Application No. 63-212432, and its schematic cross-section is shown in FIG. 5. In FIG. 5, reference numeral 45 denotes a headstock body, and reference numeral 46 denotes the work spindle rotatably supported on the headstock body 45. The work spindle 46 has at its front end a coupling member 47 and a clamp member 48, and a drive device 49 for advancing and retracting the clamp member 48 in the direction of the axis of the work spindle 46 is mounted on the rear end of this work spindle. The clamp member 48 has a guide portion 48A engageable in a groove formed in the reverse surface of the pallet 4 (see FIG. 1), and the clamp member 48 is projected forwardly from the work spindle 46, and in this condition the pallet is moved in a direction perpendicular to the axis of the work spindle 46 so as to fit the guide portion 48A in the groove of the pallet 4. Then, the clamp member 48 is retracted in the direction of the axis of the work spindle 46, thereby fixing the pallet 4 by the coupling member 47 and the clamp member 48. By reversing this operation, the pallet 4 can be detached from the work spindle 46.

A turning operation drive motor 51 is connected to the work spindle 46 via a gear train 50, and also a positioning C-axis servomotor 53 is connected to this work spindle via a gear train 52. Means for interrupting a power transmission is provided in each of the gear trains 50 and 52, and therefore each of the motors 51 and 53 can be connected to and disconnected from the work spindle 46. Therefore, by rotating the work spindle 46 at high speed by the drive motor 51, the turning operation can be applied to the workpiece, and also the work spindle 46 can be indexingly rotated (C-axis rotation) to a required rotational angle position by the C-axis servomotor 53, and also can be rotated at low speed by this servomotor so as to form gear teeth. Reference numeral 54 denotes an encoder for detecting the angular position of the work spindle 46.

In FIG. 1, reference numeral 60 denotes an operation table, reference numeral 61 an operation bed where the operation for attaching the workpiece to the pallet is carried out, reference numeral 62 a pallet magazine having a plurality of pallet holder plates 63 interconnected by an endless chain, reference numerals 64 and 65 guide rails provided between the operation bed 61 and the pallet magazine 62 and between the pallet magazine 62 and the headstock 3 so as to guide the pallet, reference numeral 66 a first pallet transfer device for transferring the pallet 4 between the operation bed 61 and the pallet magazine 62, and reference numeral 67 a second pallet transfer device for transferring the pallet between the pallet magazine 62 and the headstock 3. These devices are also similar in construction to those disclosed in Japanese Laid-Open Patent Application No. 63-212432, and a plurality of pallets, to which workpieces to be machined are attached, are beforehand held in the pallet magazine 62, and the pallet exchange is automatically effected between the headstock 3 and the pallet magazine 62, thus performing an unmanned operation of the machine tool. Details are disclosed in the above publication, and therefore explanation is omitted.

Figure 6:
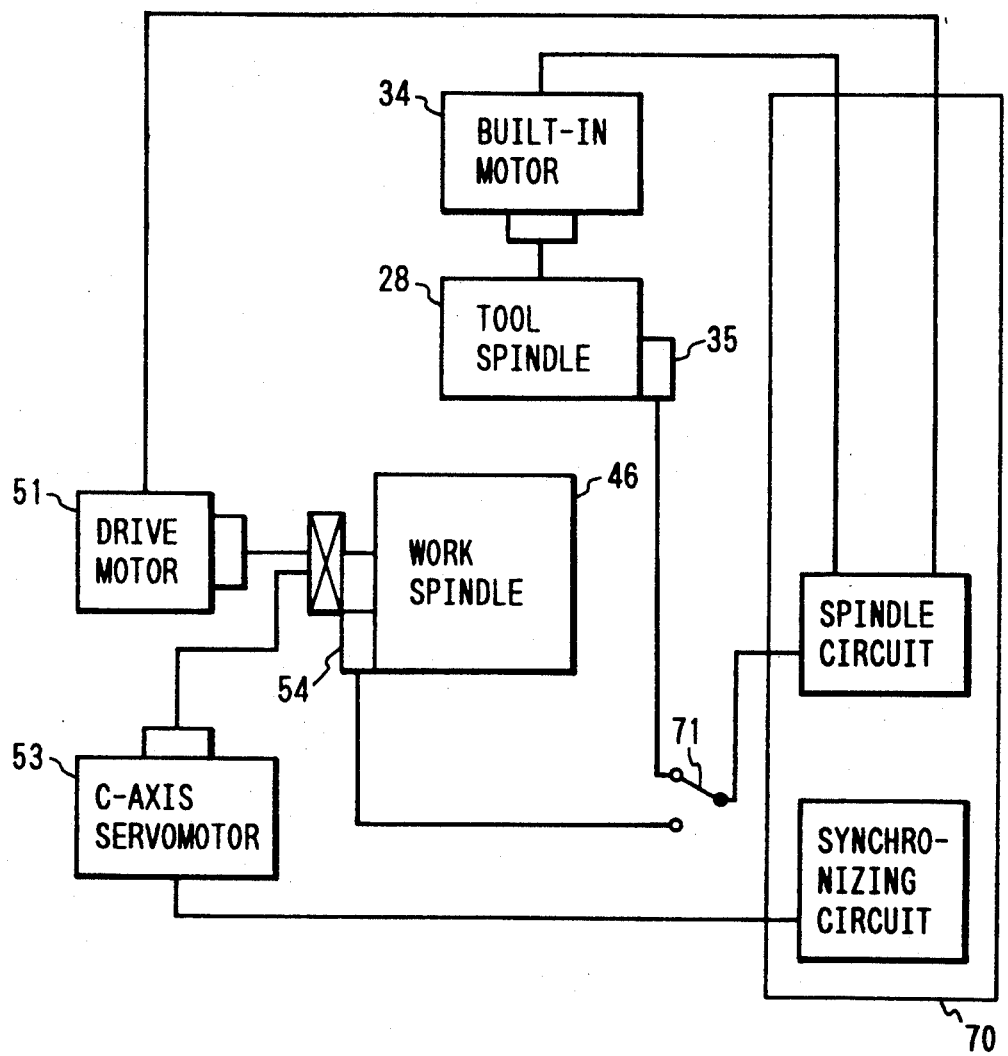
FIG. 6 is a block diagram showing a portion of a control device of the above machine tool.

A NC (numerically-controlled) device is provided at the above composite-machining machine tool, and the indexing of the work spindle, the feed of the table 2, the X-axis slide 8, the Y-axis slide 10 and etc., the indexing (B-axis indexing) of the tool spindle head 14, and etc., can be numerically controlled. FIG. 6 is a schematic block diagram showing a portion of its controller. Reference numeral 70 denotes the NC device for controlling the whole of the machine tool. The NC device 70 has, in addition to the above-mentioned functions, a synchronizing function for synchronizing the rotation of the work spindle 46 with the rotation of the tool spindle 28 at the time of the hobbing operation. In order to achieve this synchronization, a signal from the rotational position detection encoder 35 mounted on the tool spindle 28 is inputted to the NC device 70 via a change-over switch 71, as shown in FIG. 6. When the hobbing operation is not effected, the change-over switch 71 is switched, so that a signal from the encoder 54 for detecting the rotational angle position of the work spindle 46 is inputted to the NC device 70.

The machine tool of the above construction in this embodiment can perform various composite machinings with respect to the workpiece. Namely, using a fixed tool, such as a cutting tool, as the tool, a turning operation can be carried out by rotating the work spindle 46, holding the workpiece, at high speed. Also, using a rotary tool, such as a milling tool and a drilling tool, as the tool, a milling operation or a drilling operation can be carried out by indexing the work spindle 46 to a predetermined rotational angle position by the C-axis indexing mechanism. Further, the workpiece can be moved in the Z-axis direction and can be subjected to the C-axis indexing, and the tool can be moved in the X-axis direction and the Y-axis direction and can be subjected to the B-axis indexing, and therefore the machining to obtain a complicated shape can be easily carried out. For effecting the B-axis indexing when carrying out these machinings, the B-axis shaft 13 is advanced by the piston 17 (FIG. 2) to release the engagement between the coupling members 15A and 15B, and the B-axis shaft 13 is positioned to a predetermined rotational angle position by the B-axis servomotor 22, and then the piston 17 is returned to the initial position. As a result, the coupling members 15A and 15B are engaged with each other to thereby fix the B-axis shaft 13 against movement. At this time, the hydraulic pressure is not supplied to the cylinder chamber 27 receiving the clamp piston 26, and therefore the clamp piston 26 is in an inoperative condition.

Figure 7:
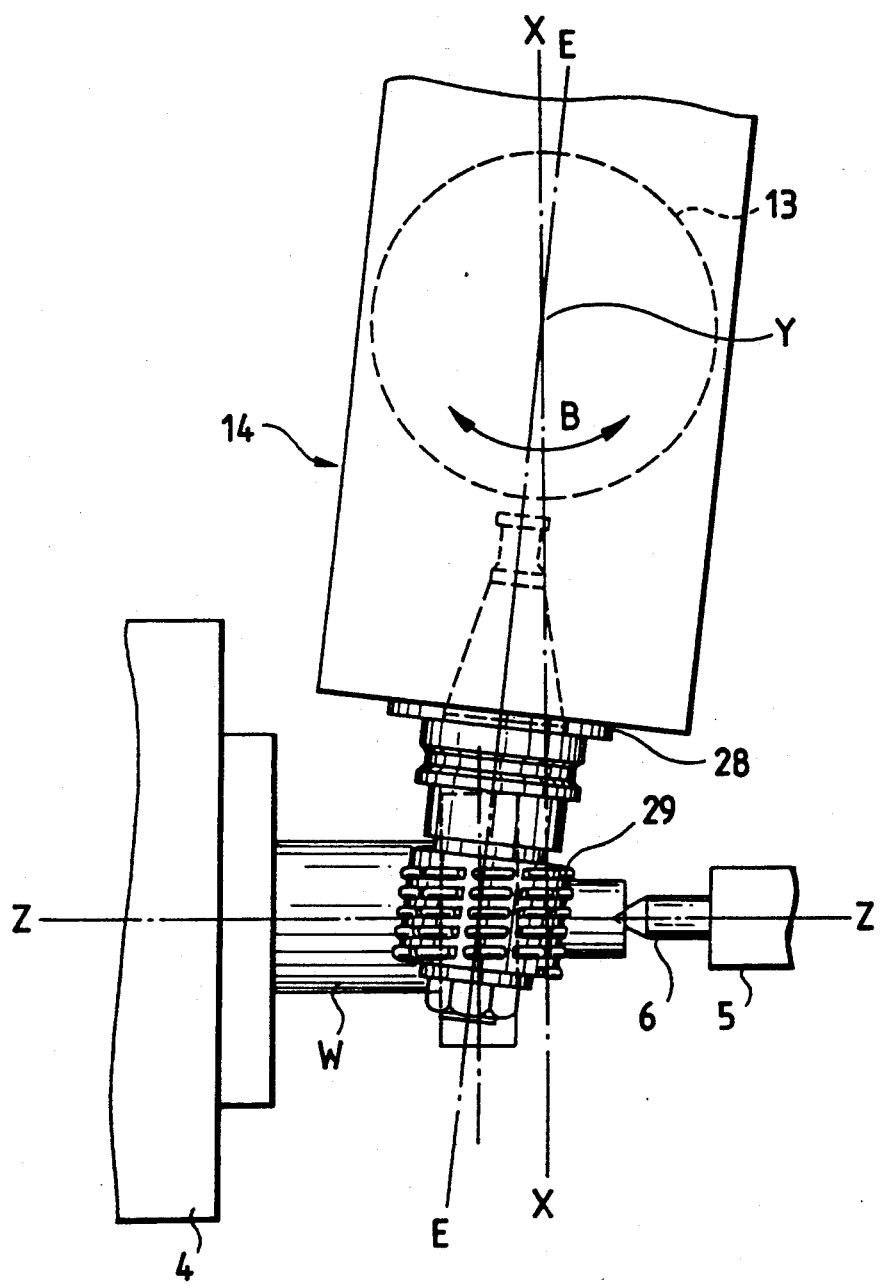
FIG. 7 is a schematic front-elevational view showing a condition in which a hobbing operation is carried out by the above machine tool.

The machine tool of this embodiment can perform, in addition to the above-mentioned machinings, the formation of gear teeth, using the hobbing tool 29 as the tool. The gear teeth formation by the hobbing tool 29 will now be described. For effecting the gear teeth formation, the predetermined hobbing tool 29 is first attached to the tool spindle 28. Then, as shown in FIG. 7, the angle of the axis E—E of the tool spindle is so adjusted that the hobbing tool 29 can be disposed at a predetermined lead angle relative to the workpiece W attached to the pallet 4 held by the work spindle (not shown). For effecting this adjustment, the B-axis shaft 13 is advanced by the piston 17 (FIG. 2) to release the engagement between the coupling members 15A and 15B, and the B-axis shaft 13 is rotated in the B-axis direction by the B-axis servomotor 22 so as to be positioned in a predetermined rotational angle position. In this case, the positioning of a high precision, for example, on the order of 0.001 degrees is carried out. After the positioning is finished, the hydraulic pressure is supplied to the cylinder chambers 27 to advance the clamp pistons 26, so that the clamp pistons 26 are pressed against the flange portion 25 (see FIG. 3) of the front end portion 13A of the B-axis shaft. As a result, the B-axis shaft 13 is positioned highly precisely, and is fixed against rotation, thus providing the condition shown in FIG. 7. In this condition, the tool spindle 28 and the hobbing tool 29 are rotated, and in synchronism with this, the work spindle and the workpiece W are rotated, and the hobbing tool 29 is fed in the Y-axis direction to cut the workpiece W, thereby forming the gear teeth.

The tool exchange with respect to the tool spindle 28 can be automatically effected in a similar manner as in the machine tool disclosed in Japanese Laid-Open Patent Application No. 63-74534. Therefore, by beforehand setting the various tools in the tool magazine 40, a required tool can be automatically taken out and can be attached to the tool spindle 28, and therefore various kinds of machinings can be applied to the workpiece. For example, by providing different kinds of hobbing tools in the tool magazine 40, different gear teeth can be formed in one workpiece.

Further, in FIG. 1, the attachment and detachment of the workpiece relative to the work spindle of the headstock 3 can be automatically effected in a similar manner as in the machine disclosed in Japanese Laid-Open Patent Application No. 63-212432. Namely, a plurality of pallets to which workpieces to be machined are attached are beforehand held in the pallet magazine 62, and by doing so, the pallets can be automatically exchanged between the headstock 3 and the pallet magazine 62, and the workpiece can be automatically attached to and detached from the work spindle.

As described above, the composite-machining machine tool of the above construction can effect the automatic exchange of the workpieces with respect to the work spindle, the automatic exchange of the tools with respect to the tool spindle, and the various kinds of automatic machinings including the hobbing operation. By beforehand providing the workpieces in the pallet magazine 62, the workpiece is set on the headstock 3, and different kinds of machinings such as turning, milling, drilling, tapping and hobbing are applied to the workpiece, and then the workpiece is returned to the pallet magazine 62, and these operations can be continuously carried out by the unmanned operation.

In the above embodiment, although the workpiece is supplied to the work spindle by the use of the pallet, and can be automatically exchanged, the present invention is not always limited to this construction, and the workpiece may be attached directly to the work spindle.

As described above, the composite-machining machine tool of the present invention can effect the turning operation and the machining center operation, and also can form gear teeth by the hobbing tool. Particularly in the gear teeth formation, kinds of gears such as a helical gear, a spur gear and a spiral gear can be dealt with by controlling the B-axis shaft, and the specification of the gear such as the number of teeth and a module can be dealt with by numerically controlling the hobbing tool. And besides, various kinds of tools are provided in the tool magazine, and the tool to be held by the tool spindle is automatically exchanged so as to apply various kinds of machinings, including the formation of gear teeth, to one workpiece held by the work spindle. Therefore, when gear teeth are to be formed in part of the workpiece, there is no need to use a machine tool for effecting the turning, the milling and etc., and a machine tool for forming gear teeth as in the prior art, and the machinings such as the turning, the milling and the drilling, as well as the gear teeth formation, can be applied to the workpiece with the use of the single machine to which the workpiece need to be attached once. Therefore, the number of the machines to be used can be reduced as compared with the prior art, and also the workpiece does not need to be switched from one machine to another, and therefore the transport of the workpiece and the attachment and detachment of the workpiece with respect to the machine can be simplified, thereby achieving an advantage that the overall time required for machining the workpiece can be reduced to thereby enhance the productivity.

Further, as described in the embodiment, in the composite-machining machine tool of the present invention, there are also provided the advantages that the supply and removal of the workpiece with respect to the work spindle can be easily automated by the use of the pallet, and that the machine, which is capable of continuously carrying out different kinds of machinings of the workpiece, including the gear teeth formation, by the unmanned operation, can be easily constructed.

While the invention has been described in connection with the preferred embodiment of the invention, it will be obvious to those skilled in the art that various changes and modifications may be made therein without departing from the invention, and it is intended, therefore, to cover in the appended claims all such changes and modifications as fall within the true spirit and scope of the invention.

What is claimed is:

1. A composite-machining machine tool comprising:
    a bed;
    a table movable relative to said bed in a horizontal Z-axis direction;
    a Z-axis drive device for reciprocally moving said table in the Z-axis direction; a headstock mounted on said table;
    a workpiece-holding work spindle rotatably held by said headstock in such a manner that an axis of said work spindle extends in the Z-axis direction;
    a spindle drive device for rotating said work spindle;
    a column fixedly mounted on said bed and having a guide surface extending in an X-axis direction perpendicular to the Z-axis direction;
    an X-axis slide supported on said guide surface of said column so as to move in the X-axis direction;
    an X-axis drive device for reciprocally moving said X-axis slide in the X-axis direction; a
    Y-axis slide supported on said X-axis slide so as to move in a Y-axis direction perpendicular to the X-axis and the Y-axis;
    a Y-axis drive device for reciprocally moving said Y-axis slide;
    a B-axis shaft supported on said Y-axis slide for rotation about an axis extending in the Y-axis direction;
    a tool spindle head mounted on a front end of said B-axis shaft, said tool spindle head having a rotatably-supported tool spindle having an axis perpendicular to the Y-axis direction;
    a tool spindle drive device for rotating said tool spindle;
    a B-axis indexing mechanism for indexingly rotating said B-axis shaft;
    a positioning coupling for fixing said B-axis shaft at a plurality of rotational angle positions with respect to said Y-axis slide;
    a clamp piston member provided at said Y-axis slide so as to fix said B-axis shaft at an arbitrary rotational angle position with respect to said Y-axis slide;
    a control device for synchronizing the rotation of said work spindle with the rotation of said tool spindle so as to form gear teeth by hobbing;
    a tool magazine provided above said column; and
    an automatic tool exchange device for exchanging a tool in said tool magazine with a tool held by said tool spindle head.

2. A composite-machining machine tool according to claim 1, in which a flange portion is formed on the front end portion of said B-axis shaft, and said clamp piston member is provided at that portion of said Y-axis slide facing said flange portion.

3. A composite-machining machine tool according to claim 2, in which the opposed surfaces of said flange portion and the clamp piston member are flat so that said flange portion can be fixed at an arbitrary rotational angle position by said clamp piston member.

4. A composite-machining machine tool according to claim 3, in which said clamp piston member comprises a plurality of said clamp pistons which are arranged circumferentially at equal pitch.

* * * * *